United States Patent
Martin et al.

[11] Patent Number: 6,067,916
[45] Date of Patent: May 30, 2000

[54] PROCESS AND DEVICE FOR PRODUCING AND UTILIZING GAS FROM WASTE MATERIALS

[75] Inventors: Johannes Martin; Michael Busch, both of Munich, Germany

[73] Assignee: Martin GmbH fur Umwelt- und Energietechnik, Munich, Germany

[21] Appl. No.: 08/978,839

[22] Filed: Nov. 26, 1997

[30] Foreign Application Priority Data

Dec. 3, 1996 [DE] Germany .............................. 196 50 119

[51] Int. Cl.[7] .............................. F23L 1/00; F23G 15/00; F23G 5/12; F23B 5/02
[52] U.S. Cl. .......................... 110/348; 110/204; 110/205; 110/210; 110/214; 110/229; 110/298; 110/344; 110/346
[58] Field of Search ..................................... 110/204, 205, 110/210, 211, 214, 229, 230, 231, 267, 278, 279, 280, 281, 282, 283, 284, 285, 286, 287, 288, 289, 290, 291, 293, 297, 298, 299, 300, 342, 344, 345, 346, 348

[56] References Cited

U.S. PATENT DOCUMENTS

| | | | |
|---|---|---|---|
| 1,839,741 | 1/1932 | Davies, Jr. .......................... | 110/342 X |
| 3,745,941 | 7/1973 | Reilly ...................................... | 110/346 |
| 4,263,857 | 4/1981 | Ban ...................................... | 110/348 X |
| 4,354,440 | 10/1982 | McRee, Jr, .............................. | 110/346 |
| 5,236,470 | 8/1993 | Levin .................................... | 110/346 X |
| 5,405,537 | 4/1995 | Goff et al. .......................... | 110/346 X |
| 5,749,309 | 5/1998 | Forsberg et al. ........................ | 110/346 |

*Primary Examiner*—Carl D. Price
*Assistant Examiner*—Ljiljana V. Ciric
*Attorney, Agent, or Firm*—Wood, Herron & Evans

[57] ABSTRACT

In a process for gasifying and burning waste materials, the waste materials are introduced into an incinerator (1) and end up on a burning grate (6) to which combustion air is conducted through various undergrate forced draft chambers (8a to 8e). In the first area combustion air is introduced at a superstoichiometric level in order to ignite the waste materials. Then, via the undergrate forced draft chambers (8c to 8e), oxygen is mixed into the air which is used for the gasification, thereby establishing a substoichiometric level which results in gasification of the waste materials. The combustible gases which result from this process pass via a waste gas flue (12) into a second furnace (2), in which the gases are burned at a superstoichiometric level through the introduction of combustion air. The resulting waste gases pass to a heat exchanger (3).

12 Claims, 1 Drawing Sheet

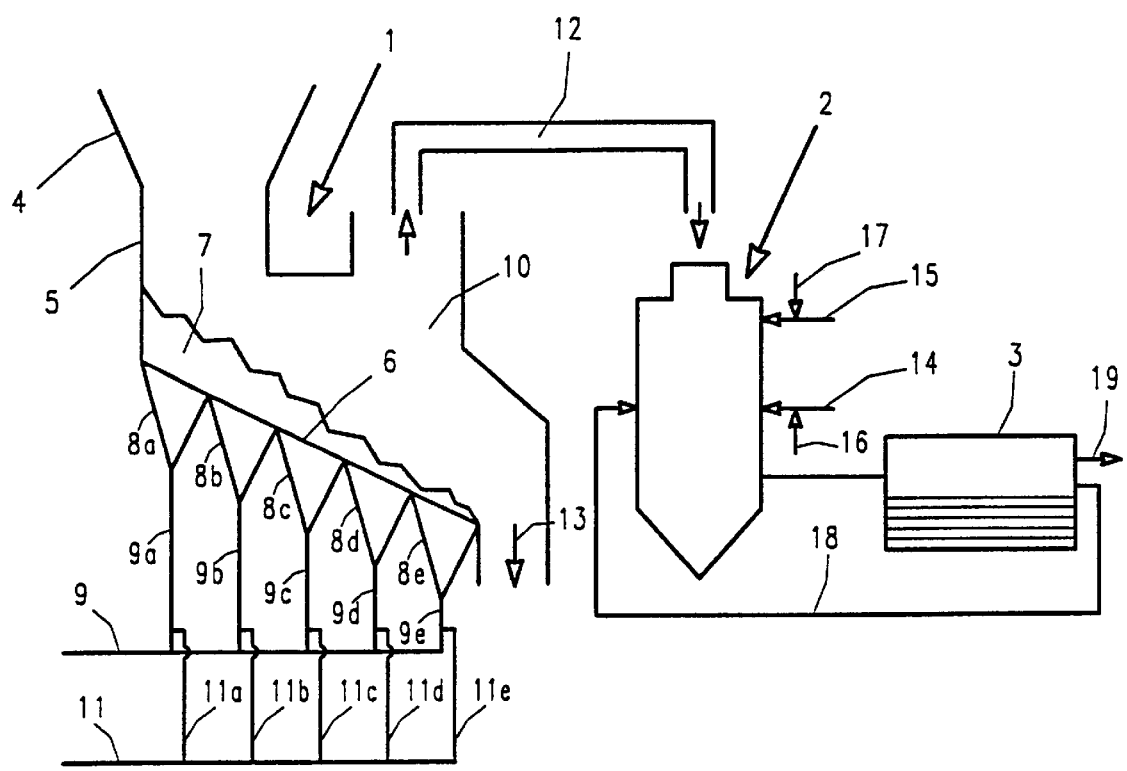

PROCESS AND DEVICE FOR PRODUCING AND UTILIZING GAS FROM WASTE MATERIALS

FIELD OF THE INVENTION

The invention pertains to a process and a device for producing and utilizing gas from waste materials, in which the waste materials are transported along a grate in a furnace and combustion air is added.

BACKGROUND OF THE INVENTION

From patent DE 42 20 265 C1 a process of this type in known in which the waste materials pass sequentially through a drying zone, a carbonizing zone, a reduction zone and an oxidation zone, in order to achieve combustion and coking toward the end of the grate. In this process large proportions of slag are formed, which must be broken up by crushing rollers of correspondingly large dimensions. The energy needed for the gasification process is conveyed to the waste material through convection and radiation by the combustion which occurs at the end of the grate, via the combustion air which is introduced for the most part above the grate. This requires an especially strong combustion process at the end of the grate, with the corresponding formation of coke and slag.

The task of the invention is to achieve a stable gasification process at lower temperatures, and thereby a good burnout of residual material, while avoiding pyrolysis coke in the slag and avoiding formation of large quantities of slag.

This problem is solved in the invention, starting from a process of the type explained at the beginning, by having an arrangement of undergrate forced-draft chambers, at least in the longitudinal direction of the grate, charged with combustion air; by the fact that the waste materials are ignited in the charging area of the grate with superstoichiometric introduction of oxygen; and that in the direction of the slag removal the combustion is limited to a substoichiometric level, which is required for gasification of the combustible components.

In this process the energy needed for gasification is not introduced from outside through excessively vigorous combustion at the end of the firing grate, and hence through heating of the combustion air and through radiant energy from the roof area which has been heated up by this incineration; instead this gasification energy comes from the incineration of the waste materials, which are continuously ignited in the charging area of the grate under superstoichiometric conditions and then continue to be incinerated under substoichiometric conditions. As a result there is always an adequate supply of energy available, making possible a stable combustion process which leads to good ash burnout and to avoidance of pyrolysis coke in the left-over residue. Since the necessary energy comes from the fuel as a result of its ignition, and does not need to be transferred to the waste materials from outside, this yields a greater degree of efficiency, with the result that it is no longer necessary to burn so much of the waste material to generate energy for the gasification process, so that a larger quantity of usable gas can be created.

These beneficial effects are still further enhanced, under a refinement of the invention, by adding oxygen to the gasification air at a substoichiometric level after the waste materials are ignited.

The advantage of this measure is that the quantity of gasification air, and hence the quantity of nitrogen which functions as ballast, can be reduced very significantly, which leads to a number of benefits. One of the benefits is that as a result of the smaller quantity of gasification air the flow speed through the bed of the fuel mass is lowered, which leads to a noticeable reduction in the flow of airborne dust. An additional substantial advantage is that lowering the proportion of nitrogen reduces the formation of nitrogen oxides. There continues to be a relatively large measure of energy available for the gasification, since it is no longer necessary to heat up so much nitrogen, which is present in the gasification air only as ballast.

The gasification is preferably carried out in such a way that the gasification temperature of the substances to be gasified is 600 to 850° C., and the air ratio needed to achieve substoichiometric gasification is 0.4 to 0.8.

The gases which are produced can be used in a great variety of ways. Preferably, provision is made to use the created gases by burning exclusively the combustible components which come from the first furnace in a second furnace which is connected to the first either directly or by a gas extraction system. This procedure depends primarily upon the oxygen content and the calorific value of the gases coming from the first furnace.

If the oxygen content of the waste gases coming from the first furnace is not sufficiently high, in order to achieve complete combustion it is beneficial to add combustion air in the form of ambient air to the waste gas coming from the first furnace.

On the other hand, if the calorific value of these gases is not sufficient to enable the necessary incineration at a higher temperature, then in a refinement of the invention a higher-grade combustible gas can be added to the combustible components in the second furnace, in accordance with their calorific value, along with the combustion air.

To achieve higher combustion temperatures in the second furnace than is possible with ambient air, there is benefit in mixing oxygen with the combustion air for the second furnace and/or to the higher-grade combustible gas, in a refinement of the invention. The introduction of oxygen in addition to the combustion air has the advantage that the quantity of combustion air which needs to be added can be kept down, which allows the quantity of waste gas from the second furnace to be reduced.

If there is sufficient oxygen present in the waste gas coming from the second furnace, and if the calorific value is also sufficiently high, waste gas which is taken from the waste gas stream after cooling in a waste heat recovery system can be recirculated into the second furnace to mix with the gas entering the second furnace from the first furnace. This burning of the mixed gases helps to regulate the combustion in the second furnace order to regulate the combustion in the second furnace. This recirculation procedure has the advantage that any gases which may still be combustible when they leave the second furnace are more completely burned during one or more additional traverses through the second furnace. Moreover, with this recirculation procedure the quantity of waste gas is lower compared to other procedures in which a higher grade combustible gas is added to the second furnace.

The incineration in the second furnace is carried out by selecting from the measures described above, preferably in such a way that in the second furnace the air ratio is 1.1 to 1.8. The combustion temperature of the gases in the second furnace is 950 to 1250° C.

The device for carrying out the process is characterized by the fact that in a furnace which comprises a fuel charging system, a grate with undergrate forced draft chambers subdivided in the longitudinal direction and possibly also in the transverse direction, and a slag removal system, the forced draft chambers have lines for the introduction of oxygen. This makes it possible to regulate the gasification with a fine touch, and furthermore with smaller quantities of waste gas compared to the exclusive use of ambient air for the gasification process.

If utilization of the generated gases by burning is planned, then the invention provides for connection of a second furnace with the first furnace, either directly or through a waste gas flue. This prevents any significant cooling of the combustible gases which arise in the first furnace, and consequently the combustion in the second furnace can be carried out at a relatively low excess air ratio, in many cases even without additional sources of energy, at such high temperatures that all of the organic components in the combustible gas can be broken down without promoting the formation of nitrogen oxides, since the temperature in the second furnace is kept at a level which is lower than a critical temperature limit at which greater quantities of nitrogen oxides begin to be formed.

In order to be able to carry out the advantageous refinements of the process, advanced implementations of the device provide for the second furnace to be equipped with at least one line for the introduction of combustion air, at least one line for the introduction of a higher-grade combustible gas, or at lease one line for the introduction of recirculated waste gas. These three measures can optionally be provided individually or in combination, depending upon the type of implementation.

BRIEF DESCRIPTION OF THE DRAWING

The invention is explained in additional detail below on the basis of a sample implementation shown in the drawing, the only figure of which is a schematic representation of a furnace with a second furnace connected to it.

DETAILED DESCRIPTION OF THE DRAWING

As can be seen from the drawing, the device for carrying out the process comprises in its essentials a furnace which is identified in its entirety as 1, as used heretofore for waste incineration, in combination with a second furnace 2 functioning as an afterburner chamber, followed by a heat exchanger 3. The other requisite devices, especially for cleaning the waste gases, are not shown in this drawing, since they are part of the current technology of furnaces and are superfluous to an explanation of the invention.

The first furnace 1 comprises a charging funnel 4 with adjacent charging chute 5, by means of which the waste materials which are to be burned are conveyed to a firing grate 6; the waste materials on the firing grate 6 are designated as 7. Beneath the firing grate 6 there are individual forced draft chambers 8a to 8e, through which air is introduced from a supply line 9 through lines 9a to 9e. The air passes through the grate 6 into the combustion chamber 10. Through the forced draft chambers 8a and 8b combustion air is supplied, possibly mixed with oxygen, in order to ignite the waste materials in a superstoichiometric atmosphere. After this initial phase of ignition air is conveyed to the grate through the forced draft chambers 8c to 8e as gasification air, preferably mixed with oxygen, with the quantity of gasification air and the quantity of oxygen adjusted so that the gasification takes place substoichiometrically with an air ratio of $\lambda=0.4$ to 0.8. Oxygen is conveyed to the individual forced draft chambers through the lines 11a to 11e, which are fed from a common line 11 and merge into the lines 9a to 9e. To regulate the respective quantities, both the lines 9a to 9e and the lines 11a to 11e are fitted with valves, which are not shown. Thus the additional introduction of oxygen leads not only to an increase in the proportion of oxygen in the supplied air, but at the same time also to a reduction in the proportion of nitrogen. The gasification is carried out in such a way that temperatures between 600 and 850° C. occur. The resulting combustible gas is conducted, with practically no loss of heat, by means of a gas flue 12 leading from the furnace, to the second furnace 2, which takes the form of an afterburner chamber. The slag which arises in the gasification process leaves the furnace by a slag removal system 13.

In the second furnace 2 the excess air ratio is adjusted to between 1.1 and 1.8, preferably at 1.2, by introducing combustion air through a line 14. The resulting temperatures are in the range of 950 to 1250° C. If the gas to be burned, coming from the first furnace 1, has too low a calorific value, an additional line 15 is provided for the introduction of high-grade combustible gas, such as natural gas. Both the line 14 for combustion air and the line 15 for higher-grade gas can have lines 16 and 17 connecting to them for additional oxygen. An additional line 18 can be provided in order to introduce recirculated waste gas into the second furnace 2; this recirculated waste gas is cooled to a temperature below 300° C. after having passed through the heat exchanger 3. This recirculated waste gas is thoroughly mixed with the combustible gas in the second furnace 2, avoiding the introduction of too much combustion air, which would be needed to create turbulence and which would increase the quantity of waste gas and also the temperature which occurs in the second furnace. At the same time any combustible components which are still present in this waste gas can be burned. The gases coming from the heat exchanger 3 are conducted through a line 19 to an gas cleaning system, which is not shown because it is not part of the invention and is generally known.

What is claimed is:

1. A process for creating and utilizing gas from waste materials, wherein the waste materials comprise combustible components, the waste materials residing in a charging area above a grate and being conveyed along the grate in the furnace with combustion air being supplied to the furnace, the grate including at least two undergrate forced draft chambers arranged in the longitudinal direction of the grate, said process comprising: supplying combustion air to the undergrate forced draft chambers in such a way that the waste materials residing in the charging area above the grate at a first end of the grate are ignited while oxygen is supplied at a superstoichiometric level and such that, at a second end of the grate in the direction of slag removal, the combustion of the waste materials is limited to a substoichiometric level necessary for gasification of the combustible components.

2. The process of claim 1 further comprising: after ignition of the waste materials, mixing oxygen at a substoichiometric level into the gasified combustible components.

3. The process of claim 1, further comprising: using an air ratio in a range of 0.4 to 0.8, thereby to achieve substoichiometric gasification of the waste materials at a gasification temperature in a range of 600 to 850° C.

4. The process of claim 2 further comprising: using an air ratio in a range of 0.4 to 0.8, thereby to achieve substoichiometric gasification of the gasified waste materials at a gasification temperature in a range of 600 to 850° C.

5. The process as in claim 1, and further comprising: in a second furnace which is operatively connected to the first furnace, using the combustible gas generated from the first furnace to burn combustible components which come from only the first furnace.

6. The process of claim 5 and further comprising: recirculating waste gas from the second furnace, after cooling of said waste gas in a heat recovery system, thereby to mix the recirculated waste gas back into the second furnace with the combustible gas coming from the first furnace.

7. The process of claim 5 wherein the air ratio in the second furnace is in a range of 1.1 to 1.8.

8. The process as in claim 5 wherein the combustion temperature in the second furnace is in a range of 950 to 1250° C.

9. The process as in claim 5 comprising: in the second furnace, adding combustion air to the combustible gas coming from the first furnace wherein the grade and the amount of the combustion air added depends on the calorific value of the combustible components.

10. The process of claim 9, and further comprising: mixing oxygen into the combustion air in the second furnace.

11. The process as in claim 1, further comprising: adding combustion air to the combustible gas coming from the first furnace.

12. A process for creating and utilizing gas from waste materials wherein the waste materials comprise combustible components, the waste materials residing in a charging area above a grate of a furnace and being conveyed along the grate in the furnace with combustion air being supplied to the furnace, the grate including at least two undergrate forced draft chambers arranged in the longitudinal direction of the grate, said process comprising:

supplying combustion air to the undergrate forced draft chambers in such a way that the waste materials residing in the charging area above a first of the undergrate forced draft chambers are ignited while oxygen is supplied at a superstoichiometric level through the first undergrate forced draft chamber, and such that at any further undergrate forced draft chambers, said supplying occurs in a manner so that combustion is limited to a substoichiometric level necessary for gasification of the combustible components.

* * * * *

UNITED STATES PATENT AND TRADEMARK OFFICE
CERTIFICATE OF CORRECTION

Patent No.: 6,067,916

Issue Date: May 30, 2000

Inventors: Johannes Martin and Michael Busch

It is certified that error appears in the above-identified patent and that said Letters Patent is hereby corrected as shown below:

In the Abstract, line 8, "...into the air..." should read –into the combustion air– as appears in the amendment filed on June 21, 1999.

Column 2, line 54, "...second furnace order to regulate..." should read –...second furnace.-- as appears in the amendment dated June 21, 1999, at page 2, line 8.

In column 4, line 64, claim 4, "...of the gasified waste..." should read –...of the waste...-- according to Examiner's amendment dated December 3, 1999.

Signed and Sealed this

Fifteenth Day of May, 2001

NICHOLAS P. GODICI

*Attest:*

*Attesting Officer*     *Acting Director of the United States Patent and Trademark Office*